(12) United States Patent
Miyahara et al.

(10) Patent No.: US 9,985,309 B2
(45) Date of Patent: May 29, 2018

(54) HIGH-MOLECULAR-WEIGHT ELECTROLYTE AND USE THEREOF

(71) Applicants: KANEKA CORPORATION, Osaka (JP); UNIVERSITY OF YAMANASHI, Kofu-shi, Yamanashi (JP)

(72) Inventors: Takahiro Miyahara, Settsu (JP); Masahiro Watanabe, Kofu (JP); Kenji Miyatake, Kofu (JP)

(73) Assignees: KANEKA CORPORATION, Osaka (JP); UNIVERSITY OF YAMANASHI, Kofu-shi (JP)

( * ) Notice: Subject to any disclaimer, the term of this patent is extended or adjusted under 35 U.S.C. 154(b) by 712 days.

(21) Appl. No.: 14/394,012

(22) PCT Filed: Nov. 21, 2012

(86) PCT No.: PCT/JP2012/080224
§ 371 (c)(1),
(2) Date: Oct. 10, 2014

(87) PCT Pub. No.: WO2013/153696
PCT Pub. Date: Oct. 17, 2013

(65) Prior Publication Data
US 2015/0064601 A1    Mar. 5, 2015

(30) Foreign Application Priority Data

Apr. 13, 2012   (JP) .................................. 2012-092350

(51) Int. Cl.
*H01M 8/10* (2016.01)
*H01M 8/1032* (2016.01)
(Continued)

(52) U.S. Cl.
CPC .......... *H01M 8/1032* (2013.01); *C08G 75/24* (2013.01); *C08J 5/2256* (2013.01); *H01M 2300/0082* (2013.01)

(58) Field of Classification Search
CPC ................. H01M 8/10; H01M 8/1032; H01M 2300/0082; C08G 75/24; C08J 5/2256
See application file for complete search history.

(56) References Cited

U.S. PATENT DOCUMENTS

2001/0041279 A1*  11/2001  Terahara ................... C08F 8/36
                                                                                     429/493
2006/0182678 A1*   8/2006  Shinoda ................. C08G 65/00
                                                                                     423/414
(Continued)

FOREIGN PATENT DOCUMENTS

CN        1806902 A      7/2006
JP     2001-192531 A     7/2001
(Continued)

OTHER PUBLICATIONS

S. Swier et al. I Journal of Membrane Science 256 (2005) 122-133.*
(Continued)

*Primary Examiner* — Alex Usyatinsky
(74) *Attorney, Agent, or Firm* — Westerman, Hattori, Daniels & Adrian, LLP

(57) ABSTRACT

The present invention aims to provide a hydrocarbon-based polymer electrolyte which is excellent in processability and proton conductivity, especially proton conductivity at low water content, and a membrane thereof. The polymer electrolyte contains, in its main chain, a repeating unit represented by the following formula (1):

(Continued)

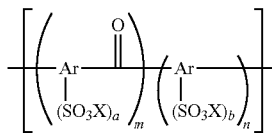

(1)

wherein Ar represents a benzene or naphthalene ring, or a derivative thereof in which one or more of the ring-forming carbon atoms is replaced by a hetero atom; X represents a proton or a cation; a and b are each an integer of 0 to 4, and the sum of a's and b's is 1 or greater; m represents an integer of 1 or greater; and n represents an integer of 0 or greater.

14 Claims, 2 Drawing Sheets

(51) Int. Cl.
  *C08G 75/24* (2006.01)
  *C08J 5/22* (2006.01)

(56) References Cited

U.S. PATENT DOCUMENTS

| | | | | |
|---|---|---|---|---|
| 2007/0231652 | A1* | 10/2007 | Itou | C08J 5/2256 429/480 |
| 2007/0264551 | A1* | 11/2007 | Matsunaga | H01M 4/8605 429/483 |
| 2009/0075147 | A1* | 3/2009 | Kitamura | C08G 65/40 429/493 |

FOREIGN PATENT DOCUMENTS

| | | | |
|---|---|---|---|
| JP | 2005-243289 | A | 9/2005 |
| JP | 2006-70116 | A | 3/2006 |
| JP | 2007-59374 | A | 3/2007 |
| JP | 2007-115475 | A | 5/2007 |
| JP | 2007-280946 | A | 10/2007 |
| JP | 2008-38043 | A | 2/2008 |
| JP | 2009-200030 | A | 9/2009 |
| JP | 2009-216280 | A | 9/2009 |
| JP | 2010-56738 | A | 3/2010 |
| JP | 2010-189503 | A | 9/2010 |
| JP | 2011-18613 | A | 1/2011 |
| JP | 2011-18990 | A | 1/2011 |
| JP | 2012-252915 | A | 12/2012 |
| WO | 2009/005055 | A1 | 1/2009 |

OTHER PUBLICATIONS

JP 2008-81668 Abstr.*
International Preliminary Report on Patentability (Form PCT/IB/373) dated Oct. 14, 2014, of International Application No. PCT/JP2012/080224, with Form PCT/ISA/237. (6 pages).
Phillips, R. W et al., Isomeric Poly (benzophenone)s: Synthesis of Highly Crystalline Poly (4,4'-benzophenone) and Amorphous Poly(2,5-benzophenone), a Soluble Poly (p-phenlene) Derivative, "Macromolecules" Feb. 10, 1994 vol. 27, pp. 2354-2356., Department of Chemistry, University of North Carolina at Chapel Hill, Chapel Hill, NC 27599-3290.
International Search Report dated Feb. 26, 2013, issued in corresponding International Application No. PCT/JP2012/080224. (2 pages).

* cited by examiner 4　5　3　2　1　2　3　5　4

HIGH-MOLECULAR-WEIGHT ELECTROLYTE AND USE THEREOF

TECHNICAL FIELD

The present invention relates to a polymer electrolyte suitable for polymer electrolyte fuel cells, and a polymer electrolyte membrane and a membrane electrode assembly each including the polymer electrolyte, as well as fuel cells including these components.

BACKGROUND ART

Because of recent concerns about environmental issues such as global warming, etc., there is a need to develop highly efficient, clean energy sources. Fuel cells attract attention as a candidate for such energy sources. Fuel cells directly generate electricity by supplying electrodes separated by an electrolyte with fuel (e.g. hydrogen gas, methanol) and an oxidizing agent (e.g. oxygen), respectively, and oxidizing the fuel on one electrode while reducing the oxidizing agent on the other electrode. One of the most important components among the above fuel cell materials is the electrolyte which can form an electrolyte membrane separating the fuel and the oxidizing agent. Various electrolyte membranes have been developed and, particularly in recent years, polymer electrolytes that include a polymer compound containing a proton conductive functional group (e.g. a sulfonate group) have been actively developed. Such polymer electrolytes can be used not only for polymer electrolyte fuel cells but also as materials for electrochemical elements such as humidity sensors, gas detectors, and electrochromic display elements, for example. In particular, polymer electrolyte fuel cells among the aforementioned applications of the polymer electrolytes are expected to be one of key new energy technologies. For example, polymer electrolyte fuel cells that include an electrolyte membrane formed from a proton conductive functional group-containing polymer compound are characterized in that they allow operation at low temperatures, reduction in size and weight, and the like. Such polymer electrolyte fuel cells are considered for application to movable vehicles such as automobiles, household cogeneration systems, small portable devices for consumer use, and the like.

In the 1950s, styrene-based cation exchange membranes were developed as electrolyte membranes for polymer electrolyte fuel cells. However, such membranes are poor in stability in a fuel cell operating environment and thus have not been able to produce fuel cells having sufficiently long life. On the other hand, perfluorocarbon sulfonic acid membranes, typically represented by Nafion®, are widely considered as electrolyte membranes having practical stability. Perfluorocarbon sulfonic acid membranes are high in proton conductivity and are thought to be excellent in chemical stability such as acid resistance and oxidation resistance. However, the materials of Nafion® cost high and the production process thereof is complicated, so that Nafion has the disadvantage of very high costs. Besides, it is pointed out that Nafion deteriorates due to hydrogen peroxide generated by the reactions at the electrodes and hydroxy radicals which are by-products of the reactions. Furthermore, the structure of Nafion limits the introduction of sulfonate groups, which are proton conductive groups, thereinto.

In this context, the development of hydrocarbon-based electrolyte membranes is again desired. This is because hydrocarbon-based electrolyte membranes are characterized in that they are easily modified to have various chemical structures, and thus allow a wide range of adjustment to introduce proton conductive groups (e.g. sulfonate groups), and that they are relatively easy to combine with other materials and to crosslink, etc.

In a recent example, many sulfonate groups are introduced into an electrolyte membrane to improve the proton conductivity of the membrane. Still, such a membrane is disadvantageous for use as an electrolyte membrane for fuel cells because the membrane greatly swells when it is wet, and the strength of the membrane is deteriorated as a result of repeating wet and dry cycles. Thus, a rigid structure is being attempted to be introduced into an electrolyte membrane to increase the strength of the membrane.

An example of such rigid structures is a benzophenone structure. However, it is usually difficult for polymers containing such a rigid structure to have an increased molecular weight because then they present a solubility problem in reaction solvents. Patent Literature 1 teaches that the carbonyl group of the benzophenone structure is converted into an alkyl ether during polymerization to improve solubility, and that after the molecular weight is increased, the resulting polymer is subjected to acid treatment so that the alkyl ether is re-converted into a carbonyl group. Moreover, Patent Literature 2 discloses the synthesis of a polyether ether ketone containing a rigid benzophenone structure. In order to provide a high molecular weight polymer, a t-butyl group is introduced into part of the aromatic rings. As mentioned above, it is usually difficult to increase the molecular weight of a polymer with a benzophenone structure, which requires improved techniques, such as increasing solubility. However, although these polymers contain an ether bond and have relatively high solubility, they disadvantageously easily deteriorate when they are used for electrolyte membranes for fuel cells.

Patent Literature 3 (see Reference Synthesis Example 3) mentions as examples of polymers having no ether bond but containing a benzophenone structure, random copolymers partially including poly(4,4'-benzophenone). Still, the copolymers thus obtained have a number average molecular weight as low as about 12000. This means that it is difficult for such copolymers to have a higher molecular weight. Moreover, this literature teaches that such a polymer is sulfonated, but this method is usually incapable of introducing a sulfonate group into the poly(4,4'-benzophenone) structure.

Non-Patent Literature 1 discloses the synthesis of poly(2, 5-benzophenone) which has the same composition as poly (4,4'-benzophenone), and the comparison of the properties between the polymers. As taught in this literature, since the polymers have the same composition but differ in linking position, the poly(4,4'-benzophenone) has a higher crystallinity and a lower solubility than the poly(2,5-benzophenone), and therefore the poly(4,4'-benzophenone) is difficult to synthesize and cannot be synthesized by the same method. In order to produce poly(4,4'-benzophenone), this literature provides an improved technique in which the carbonyl groups of monomers are converted into imino groups and the resulting monomers are polymerized, followed by hydrolysis to re-convert the imino groups into carbonyl groups. As mentioned above, poly(4,4'-benzophenone) is difficult to directly synthesize.

CITATION LIST

Patent Literature

Patent Literature 1: JP 2007-59374 A

Patent Literature 2: JP 2009-200030 A

Patent Literature 3: JP 2001-192531 A
Non Patent Literature
Non Patent Literature 1: Macromolecules 1994, 27, 2354-2356

SUMMARY OF INVENTION

Technical Problem

The present invention aims to provide a hydrocarbon-based polymer electrolyte which is excellent in processability and proton conductivity, especially proton conductivity at low water content, and a membrane thereof.

Solution to Problem

The present inventors have made diligent studies to solve the above problems, and have found that a polymer electrolyte including a polymer that contains a sulfonate group, which is favorable for proton conductivity, and further contains a rigid carbonyl structure in the main chain can be used to achieve a high membrane strength and excellent proton conductivity at low water content, thereby having completed the present invention.

Specifically, the present invention relates to a polymer electrolyte, containing, in its main chain, a repeating unit represented by the following formula (1):

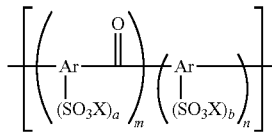
(1)

wherein Ar represents a benzene or naphthalene ring, or a derivative thereof in which one or more of the ring-forming carbon atoms is replaced by a hetero atom; X represents a proton or a cation; a and b are each an integer of 0 to 4, and the sum of a's and b's is 1 or greater; m represents an integer of 1 or greater; and n represents an integer of 0 or greater.

Preferably, the polymer electrolyte further contains, in its main chain:
a unit represented by the following formula (2):

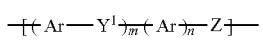
(2)

wherein Ar, m, and n are defined as in the formula (1); $Y^1$ is $SO_2$, $C(CH_3)_2$, or $C(CF_3)_2$; and Z represents a direct bond, oxygen, or sulfur; and/or a unit represented by the following formula (3):

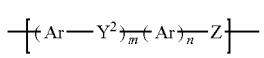
(3)

wherein Ar, m, and n are defined as in the formula (1); $Y^2$ is CO, $SO_2$, $C(CH_3)_2$, or $C(CF_3)_2$; and Z represents a direct bond, oxygen, or sulfur, the number of moles A of the unit represented by the formula (2) and the number of moles B of the unit represented by the formula (3) satisfying the following equation: B/(A+B)=0 to 0.95.

The repeating unit represented by the formula (1) is preferably a unit represented by the following formula (4):

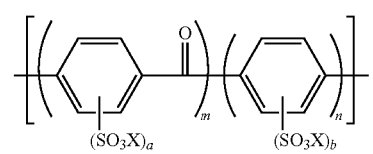
(4)

wherein X, a, b, m, and n are defined as in the formula (1).

Preferably, the unit represented by the formula (2) is a unit represented by the following formula (5):

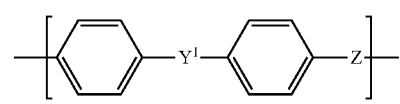
(5)

wherein $Y^1$ and Z are defined as in the formula (2), and the unit represented by the formula (3) is a unit represented by the following formula (6):

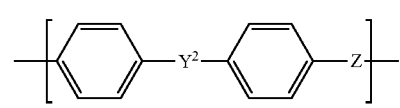
(6)

wherein $Y^2$ is defined as in the formula (3) and Z is defined as in the formula (2).

Preferably, the polymer electrolyte further contains, in its main chain, a unit represented by the following formula (7):

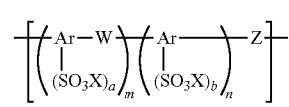
(7)

wherein Ar, X, a, b, m, and n are defined as in the formula (1); Z is defined as in the formula (2);
and W is a direct bond, CO, $SO_2$, $C(CH_3)_2$, or $C(CF_3)_2$.

The total content of the repeating unit represented by the formula (1) is preferably 20% by weight or more of the whole.

Preferably, the polymer electrolyte comprises a block copolymer containing a sulfonate-containing hydrophilic segment and a sulfonate-free hydrophobic segment, the sulfonate-containing hydrophilic segment containing the repeating unit represented by the formula (1).

The sulfonate-free hydrophobic segment preferably contains the unit represented by the formula (2) and/or the unit represented by the formula (3).

Preferably, the repeating unit represented by the formula (1) accounts for 20% by weight or more of the sulfonate-containing hydrophilic segment.

The sulfonate-containing hydrophilic segment preferably contains, in its main chain, a repeating unit represented by the following formula (8):

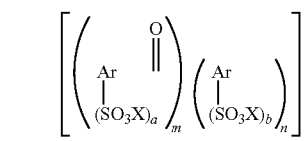

(1)

wherein Ar represents a benzene or naphthalene ring, or a derivative thereof in which one or more of the ring-forming carbon atoms is replaced by a hetero atom; X represents a proton or a cation; a and b are each an integer of 0 to 4, and the sum of a's and b's is 1 or greater; m represents an integer of 1 or greater; and n represents an integer of 0 or greater. Examples of cations include ions of the Group 1 metals such as lithium, sodium, and potassium; ions of the Group 2 metals such as magnesium and calcium; ions of the Group 13 metals such as aluminum; and ions of transition metals of Groups 3 to 12. Moreover, the ratio n/(m+n) is preferably 0 to 0.95, and more preferably 0.30 to 0.90. In the polymer electrolyte of the present invention, the total content of the repeating unit represented by the formula (1) is preferably 20% by weight or more, and more preferably 30% by weight or more, of the whole. The upper limit is not particularly limited. If the total content of the repeating unit represented by the formula (1) is less than 20% by weight, the polymer electrolyte may fail to have sufficient proton conductivity.

For easy availability of the materials, the repeating unit represented by formula (1) is preferably one in which Ar is a benzene ring, in other words, a unit represented by the following formula (4):

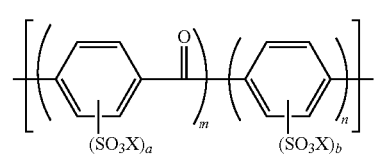

(4)

wherein X, a, b, m, and n are defined as in the formula (1).

For easy synthesis, the polymer electrolyte of the present invention preferably further contains, in its main chain, a unit represented by the following formula (2):

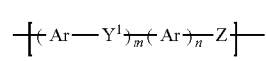

(2)

wherein Ar, m, and n are defined as in the formula (1); $Y^1$ is $SO_2$, $C(CH_3)_2$, or $C(CF_3)_2$; and Z represents a direct bond, oxygen, or sulfur, and/or a unit represented by the following formula (3):

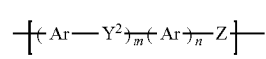

(3)

wherein Ar, m, and n are defined as in the formula (1); $Y^2$ is CO, $SO_2$, $C(CH_3)_2$, or $C(CF_3)_2$; and Z represents a direct bond, oxygen, or sulfur.

Further, the number of moles A of the unit represented by the formula (2) and the number of moles B of the unit represented by the formula (3) preferably satisfy the follow-

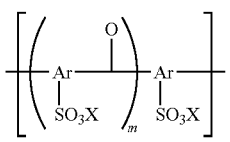

(8)

wherein Ar, X, and m are defined as in the formula (1).

The polymer electrolyte preferably has an ion exchange capacity of 1.0 to 4.0 meq/g.

The sulfonate-containing hydrophilic segment preferably further contains, in its main chain, a unit represented by the following formula (7):

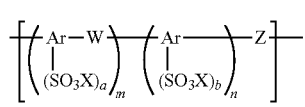

(7)

wherein Ar, X, a, b, m, and n are defined as in the formula (1), Z is defined as in the formula (2);
and W is a direct bond, CO, $SO_2$, $C(CH_3)_2$, or $C(CH_3)_2$.

The present invention also relates to a polymer electrolyte membrane, including the polymer electrolyte.

The present invention also relates to a membrane electrode assembly or a polymer electrolyte fuel cell, including the polymer electrolyte membrane, and to a polymer electrolyte fuel cell, including the membrane electrode assembly.

Advantageous Effects of Invention

The polymer electrolyte of the present invention, when formed into a polymer electrolyte membrane, is high in membrane strength and has excellent proton conductivity at low water content.

DESCRIPTION OF EMBODIMENTS

Figure 1:
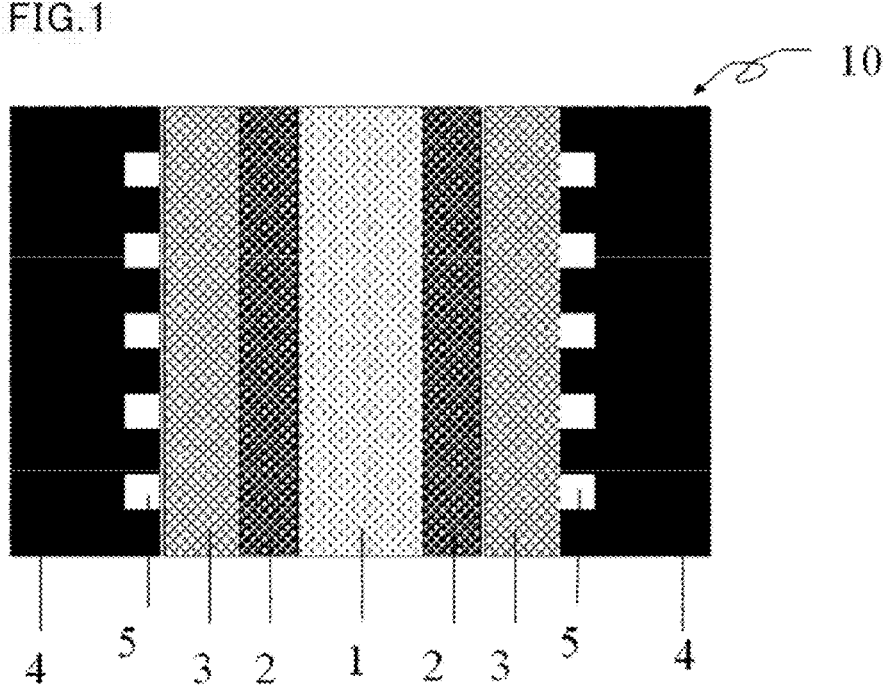
FIG. 1 is a structure diagram showing the cross-section of a principal part of a polymer electrolyte fuel cell including a polymer electrolyte membrane of the present invention.

An embodiment of the present invention will be described below. The present invention is not limited to the following description.

<1. Polymer Electrolyte>

The polymer electrolyte of the present invention characteristically contains, in its main chain, a repeating unit represented by the following formula (1):

ing equation: B/(A+B)=0 to 0.95, more preferably 0 to 0.60. Moreover, the ratio n/(m+n) is preferably 0 to 0.95, and more preferably 0.30 to 0.90.

For easy availability of the materials, the units represented by the formulae (2) and (3) are preferably those in which Ar is a benzene ring, and m and n are each 1, in other words, units represented by the following formulae (5) and (6), respectively:

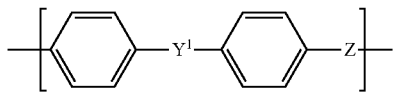
(5)

wherein $Y^1$ and Z are defined as in the formula (2), and

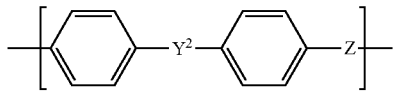
(6)

wherein $Y^2$ is defined as in the formula (3); and Z is defined as in the formula For easy processability, the polymer electrolyte of the present invention preferably further contains, in its main chain, a unit represented by the following formula (7):

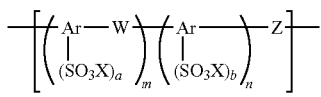
(7)

wherein Ar, Y, a, b, m, and n are defined as in the formula (1); Z is defined as in the formula (2); and W is a direct bond, CO, $SO_2$, $C(CH_3)_2$, or $C(CF_3)_2$.

Moreover, the ratio n/(m n) is preferably 0 to 0.95. The total content of the unit represented by the formula (7) is preferably 5% by weight or more, and more preferably 10% by weight or more, of the whole. The upper limit is not particularly limited, and is preferably 80% by weight or less, and more preferably 70% by weight or less. If the total content of the unit represented by the formula (7) exceeds 80% by weight, the resulting polymer electrolyte tends to have reduced resistance to dissolution in water. If the total content is less than 5% by weight, the resulting polymer electrolyte tends to have reduced processability.

The polymer electrolyte of the present invention may include any of a random copolymer, a graft copolymer and a block copolymer as long as it contains the aforementioned unit in the main chain. The water content in the polymer electrolyte membrane is reduced under low humidity conditions. In this case, in order to enhance proton conductivity, it is necessary to effectively use water which serves as a medium for proton conduction. Thus, the polymer electrolyte more preferably includes a block copolymer which can exhibit microphase separation to form a high water content phase.

Further, the block copolymer which exhibits microphase separation preferably includes a sulfonate-containing hydrophilic segment and a sulfonate-free hydrophobic segment because then more water can be collected in the hydrophilic phase by phase separation between the hydrophilic phase and the hydrophobic phase.

The sulfonate-containing hydrophilic segment preferably contains the repeating unit represented by the formula (1), and preferably contains, in its main chain, the repeating unit represented by the formula (1) in which a, b, and n are each 1, in other words, a repeating unit represented by the following formula (8):

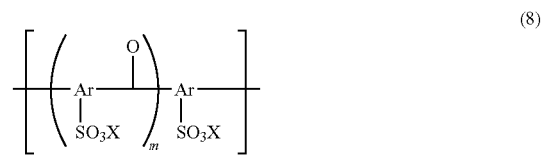
(8)

wherein Ar, X, and m are defined as in the formula (1).

Also, the sulfonate-containing hydrophilic segment preferably further contains, in its main chain, a unit represented by the following formula (7):

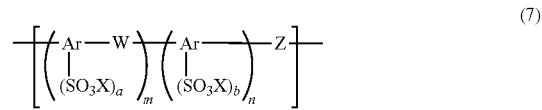
(7)

wherein Ar, X, a, b, m, and n are defined as in the formula (1); Z is defined as in the formula (2); and W is a direct bond, CO, $SO_2$, $C(CH_3)_2$, or $C(CF_3)_2$.

In view of resistance to dissolution in water, the repeating unit represented by the formula (1) preferably accounts for 20% by weight or more, more preferably 30% by weight or more, of the sulfonate-containing hydrophilic segment. The upper limit is not particularly limited. Less than 20% by weight of the repeating units represented by the formula (1) tend to result in a reduction in resistance to dissolution in water.

The sulfonate-free hydrophobic segment preferably has a structure that makes it easy to provide a high molecular weight polymer. In particular, the sulfonate-free hydrophobic segment preferably contains a unit represented by the following formula (2):

(2)

wherein Ar, m, and n are defined as in the formula (1); $Y^1$ is $SO_2$, $C(CH_3)_2$, or $C(CF_3)_2$; and Z represents a direct bond, oxygen, or sulfur, and/or a unit represented by the following formula (3):

(3)

wherein Ar, m, and n are defined as in the formula (1); $Y^2$ is CO, $SO_2$, $C(CH_3)_2$, or $C(CF_3)_2$; and Z represents a direct bond, oxygen, or sulfur, because such a segment is well soluble in organic solvents and makes it easy to provide a high molecular weight polymer.

In view of proton conductivity and the resistance to dissolution of the membrane, the polymer electrolyte of the present invention preferably has an ion exchange capacity of 1.0 to 4.0 meq/g, more preferably 1.2 to 3.8 meq/g, and still more preferably 1.4 to 3.6 meq/g.

When the polymer electrolyte of the present invention includes a graft copolymer or a block copolymer, the ion exchange capacity of the hydrophilic segment is preferably 1.00 to 6.50 meq/g, more preferably 5.30 to 6.00 meq/g, and still more preferably 5.82 to 6.00 meq/g, in view of proton conductivity.

Moreover, part or all of the sulfonate groups contained in the polymer electrolyte of the present invention preferably exist(s) on an aromatic ring(s) containing an electron withdrawing group. More preferred are units represented by the following formula:

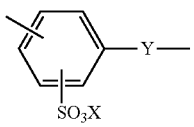

wherein X is a proton or a cation; and Y represents a divalent electron withdrawing group, such as CO, $SO_2$, or $C(CF_3)_2$.

Still more preferred are units represented by the following formula:

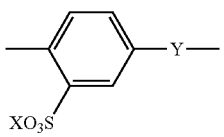

wherein X is a proton or a cation; and Y represents a divalent electron withdrawing group, such as CO, $SO_2$, or $C(CF_3)_2$.

Most preferred are units represented by the following formula:

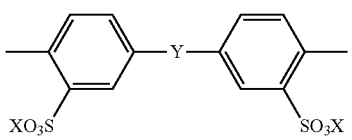

wherein X is a proton or a cation; and Y represents a divalent electron withdrawing group, such as CO, $SO_2$, or $C(CF_3)_2$.

<2. Synthesis of Polymer Electrolyte of Present Invention>

The polymer electrolyte of the present invention may be synthesized using a common polymerization reaction ("Jikken Kagaku Kouza, 4th edition, Yuki Gosei VII, Yuki Kinzoku Shiyaku ni yoru Gosei", p. 353-366 (1991), MARUZEN PUBLISHING CO., LTD.), for example.

The materials for polymerization may be compounds each having a leaving group at two or more positions, and may be compounds containing leaving groups such as halogen groups or sulfonic acid ester groups. Compounds each having as a leaving group a halogen group, such as chlorine, bromine, or iodine, at two positions are preferred in view of availability of the materials and reactivity.

The materials each preferably has a polystyrene equivalent number average molecular weight (hereinafter, simply abbreviated as molecular weight unless otherwise mentioned) of 50 to 1000000. In particular, the material for forming a sulfonate-containing hydrophilic segment preferably has a molecular weight of 100 to 50000, and the material for forming a sulfonate-free hydrophobic segment preferably has a molecular weight of 1000 to 100000. The polymer electrolyte of the present invention synthesized from these materials preferably has a molecular weight of 10000 to 5000000, more preferably 20000 to 1000000 because such a polymer electrolyte is excellent in processability when producing polymer electrolyte membranes and, at the same time, the resulting polymer electrolyte membranes have excellent strength.

The polymerization reaction may be performed in an inert gas atmosphere, such as a nitrogen gas atmosphere or an argon atmosphere, and is preferably performed in a nitrogen atmosphere.

The solvent used in the polymerization reaction step may be any solvent that does not inhibit the polymerization. Examples thereof include carbonate compounds (e.g. ethylene carbonate, and propylene carbonate); heterocyclic compounds (e.g. 3-methyl-2-oxazolidinone, 1-methyl-2-pyrrolidone (hereinafter, abbreviated as NMP), and N,N-dimethyl imidazolidinone (hereinafter, abbreviated as DMI)); cyclic ethers (e.g. dioxane, and tetrahydrofuran); acyclic ethers (e.g. diethyl ether, and ethylene glycol dialkyl ethers); nitrile compounds (e.g. acetonitrile, glutarodinitrile, and methoxyacetonitrile); polar aprotic substances (e.g. N,N-dimethylacetamide (hereinafter, abbreviated as DMAc), N,N-dimethylformamide (hereinafter, abbreviated as DMF), dimethyl sulfoxide (hereinafter, abbreviated as DMSO), and sulfolane); and nonpolar solvents (e.g. toluene, and xylene). Preferred among these are DMAc, DMF, NMP, DMI, DMSO, and the like because the polymer is highly soluble therein. Particularly preferred are DMAc and DMSO because the polymer is highly soluble therein. These solvents may be used alone or in combination of two or more. Moreover, in order to remove a slight amount of water existing in these solvents, it is effective to add an azeotropic solvent, such as benzene, toluene, xylene, or cyclohexane to azeotropically remove water.

The reaction temperature in the polymerization reaction step may appropriately be adjusted in accordance with the intended polymerization reaction. Specifically, the reaction temperature should be adjusted in the range of 0° C. to 200° C., more preferably 20° C. to 170° C., and still more preferably 40° C. to 140° C. If the reaction temperature is lower than the range mentioned above, the reaction may proceed slowly. If the reaction temperature is higher than the range mentioned above, the reaction may be greatly affected by, for example, trace impurities, possibly resulting in staining of the resulting polymer or an undesired side reaction, etc.

The polymerization reaction step preferably includes a terminating operation. This operation may be accomplished by cooling, dilution, or addition of a polymerization inhibitor. The resulting polymer may be taken out after the polymerization reaction step. Further, the purification step may be added.

When the polymer electrolyte of the present invention is synthesized as a block copolymer, the material for forming a sulfonate-containing hydrophilic segment may be a compound having a leaving group at two or more positions. Examples of leaving groups include halogen groups and sulfonic acid ester groups. Preferred are compounds containing leaving groups on an aromatic ring(s). For easy availability of the material, dichlorobenzene derivatives, dichlorobenzophenone derivatives, and dichlorodiphenylsulfone derivatives are more preferred.

The material for forming a sulfonate-free hydrophobic segment may be a compound having a leaving group at two or more positions. Examples of leaving groups include halogen groups and sulfonic acid esters. Preferred are compounds containing leaving groups on an aromatic ring(s). For easy availability of the material, dichlorobenzene derivatives, dichlorobenzophenone derivatives, dichlorodiphenylsulfone derivatives, and polymers synthesized from at least such a material and having a leaving group at two or more positions are more preferred. When the material for forming a hydrophobic segment is a polymer, the molecular weight thereof is preferably 1000 to 100000.

In the synthesis of the polymer electrolyte of the present invention, part or all of the carbonyl groups contained in the materials for a hydrophilic segment and a hydrophobic segment may be protected to decrease rigidity and thereby provide a polymer having a higher molecular weight.

The protection of a carbonyl group is a common technique in organic synthesis. According to this technique, when a carbonyl group is to cause adverse effects, the carbonyl group is temporarily converted into a functional group having different properties in the synthesis process. The protected carbonyl group can usually be deprotected and converted into a carbonyl group.

A carbonyl group may be protected using a common method (Theodora W. Greene, "Protective Groups in Organic Synthesis Third Edition", pp. 293-368, (1999), John Wiley & Sons, Inc.), for example. The protection may be carried out at any of the monomer stage, the oligomer stage and the polymer stage.

A specific example of the method of protecting a carbonyl group is to react a carbonyl group with an alcohol to convert the carbonyl into an acetal or ketal. For example, the method disclosed in JP 2007-59374 A may be used. Another method is to react a carbonyl group with an amine to convert the carbonyl into an imine or ketimine. For example, the method disclosed in Macromolecules, 1994, 27, 2354-2356 may be used. In any case, deprotection may be performed by the methods disclosed in the above documents, for example. Acetals, ketals, imines, and ketimines as mentioned above are hydrolyzable and thus can be deprotected in solvents containing water. In general, deprotection is carried out under acidic conditions in order to accelerate the deprotection process.

Specifically, the carbonyl group in the formula (1) may be protected and converted into $CR^1R^2$ or $C=NR^3$, wherein $R^1$ and $R^2$ each represents an alkoxy group or an aryloxy group; $CR^1R^2$ may form a cyclic structure; and $R^3$ represents an alkyl group or an aryl group.

The deprotection may easily be performed by bringing the protected group into contact with water or an acidic aqueous solution.

Moreover, for easy processing, the deprotection is preferably performed after the product is formed into a film.

The carbonyl group may be protected at any of the monomer stage, the oligomer stage and the polymer stage. The deprotection is preferably carried out at the polymer stage.

The polymer electrolyte of the present invention may be used in various industries and its use or application is not particularly limited. The polymer electrolyte of the present invention is suitable for polymer electrolyte membranes, membrane electrode assemblies, and fuel cells.

<3. Polymer Electrolyte Membrane of Present Invention>

The polymer electrolyte membrane of the present invention is prepared by forming the above polymer electrolyte into a film by any method. The film forming method may appropriately be selected from any conventionally known methods. Examples of such known methods include melt extrusion molding methods, such as hot pressing, inflation, and T-die extrusion; and methods of forming a film from a solution, such as casting and emulsion-based techniques. As an example of a method of forming a film from a solution, casting may be mentioned. The casting is a technique in which a solution of a polymer electrolyte with an adjusted viscosity is applied onto a flat plate, such as a glass plate, using a bar coater, a blade coater, or the like, and then the solvent is evaporated to provide a film. Also, another industrially common technique is to continuously apply a solution onto a belt via a coating die and evaporate the solvent to provide a continuous film.

Further, the resulting polymer electrolyte membrane may be subjected to biaxial stretching or other treatments in order to control the molecule orientation of the polymer electrolyte membrane, and may be heat treated in order to control crystallinity. The scope of the present invention also includes addition of filler and combining of a reinforcing material, such as nonwoven glass fabric, and the polymer electrolyte membrane with a press in order to improve the mechanical strength of the polymer electrolyte membrane.

The polymer electrolyte membrane may have any thickness depending on the intended use. For example, in view of reducing the internal resistance of the resulting polymer electrolyte membrane, the polymer electrolyte membrane having a thin film thickness is more desirable. In view of gas barrier properties and handleability of the resulting polymer electrolyte membrane, on the other hand, too thin a polymer electrolyte membrane may not be preferred. In view of all this, the thickness of the polymer electrolyte membrane is preferably at least 1.2 μm but not more than 350 μm. A polymer electrolyte membrane having a thickness falling within the above range has enhanced handleability, such as being easy to handle and being less likely to break. Besides, the resulting polymer electrolyte membrane can exert its proton conductivity within a desired range.

In order to further improve the properties of the polymer electrolyte membrane of the present invention, the membrane may be irradiated with radiation such as electron beams, γ-rays, or ion beams. Such irradiation allows a crosslinked structure or the like to be introduced into the polymer electrolyte membrane, possibly resulting in further improved performance. In addition, various surface treatments such as plasma treatment and corona treatment may be used to improve the properties of the polymer electrolyte membrane, such as the adhesion between the surface of the polymer electrolyte membrane and a catalyst layer.

<4. Membrane Electrode Assembly and Fuel Cell of Present Invention>

The membrane electrode assembly (hereinafter designated as MEA) according to the present invention includes the polymer electrolyte or the polymer electrolyte membrane of the present invention. The MEA is usable, for example, for fuel cells, especially polymer electrolyte fuel cells.

The MEA may be produced by any conventionally known methods used with conventionally studied polymer electrolyte membranes containing perfluorocarbon sulfonic acid or other hydrocarbon-based polymer electrolyte membranes (e.g. sulfonated polyether ether ketones, sulfonated polyether sulfones, sulfonated polysulfones, sulfonated polyimides, and sulfonated polyphenylene sulfides).

In addition to the aforementioned examples, the polymer electrolyte of the present invention can also be used as an electrolyte for polymer electrolyte fuel cells as disclosed in JP 2006-179298 A, for example. Persons skilled in the art would easily make polymer electrolyte fuel cells using the polymer electrolyte of the present invention by reference to such known patent literatures.

EXAMPLES

Embodiments of the present invention will be more specifically described below referring to examples. Of course, the present invention is not limited to the following examples, and the details can be modified in various respects. The present invention is also not limited to the embodiments mentioned above, and various modifications can be made within the scope of the claims. Embodiments including appropriate combinations of technical means disclosed herein are also within the technical scope of the present invention.

The molecular weight of each polymer, and the ion exchange capacity and the proton conductivity of each polymer electrolyte were measured as follows.

[Measurement of Molecular Weight]

The molecular weight was measured by GPC. The conditions were as follows.
GPC measurement device: HLC-8220 (TOSOH CORP.)
Column: SuperAW4000 (two SuperAW2500 columns connected in series, Showa Denko K.K.)
Column temperature: 40° C.
Mobile phase solvent: NMP (LiBr was added at 10 mmol/dm$^3$)
Solvent flow rate: 0.3 mL/min
Standard: TSK polystyrene standards (TOSOH Corp.)

In the following, the polystyrene standard equivalent number average molecular weight is represented as Mn and the polystyrene standard equivalent weight average molecular weight is represented as Mw.

[Measurement of Ion Exchange Capacity (Hereinafter, Abbreviated as IEC)]

A polymer electrolyte (about 100 mg, sufficiently dried) was immersed in a saturated aqueous solution of sodium chloride (20 mL) at 25° C. An ion-exchange reaction was allowed to proceed in a water bath at 60° C. for three hours, followed by cooling down to 25° C. Next, the resulting membrane was sufficiently washed with ion exchange water, and the whole saturated aqueous solution of sodium chloride and the whole washing water were collected. To the collected solution was added a phenolphthalein solution as an indicator to perform neutralization titration with a 0.01 N aqueous solution of sodium hydroxide, thereby calculating IEC (meq/g).

[Measurement of Proton Conductivity]

In the proton conductivity measurement, the resistance of an electrolyte was measured using an impedance analyzer (3532-50, HIOKI E.E. CORP.) while the temperature and humidity were kept constant (for about three hours) in a constant temperature and humidity chamber (SH-221, ESPEC CORP.). Specifically, the frequency response over the range from 50 kHz to 5 MHz was measured using the impedance analyzer, and proton conductivity was then calculated according to the following formula:

Proton conductivity(S/cm)=$D/(W \times T \times R)$ wherein D is the distance between electrodes (cm); W is the membrane width (cm); T is the membrane thickness (cm); and R is the measured resistance (Ω). This measurement was made with D=1 cm and W=1 cm, and the membrane thickness values were obtained by measuring each sample using a micrometer. The temperature and the humidity under low humidity measurement conditions were set to 80° C. and 30% RH, respectively.

[Measurement for OCV Durability Test]

An open circuit voltage (OCV) power generation test was performed under the following conditions to measure the time period until a rapid decrease in voltage occurred due to membrane cracking.
Power generation cell: product of Electrochem, Inc., electrode area: 4.84 cm$^2$
Cell temperature: 80° C.
Fuel and air humidity: 20% RH
Anode gas: 84 ml/min hydrogen
Cathode gas: 400 ml/min synthetic air
Catalyst: TEC10E50E (TANAKA HOLDINGS Co., Ltd.)
Amount of platinum supported: 0.5 mg/cm$^2$
Ionomer: Nafion DE-521CS
Gas diffusion layer: SGL25BC

[Measurement of Gas Permeability]

Gas permeability was measured using a gas permeability measurement device (20XAFK, GTR-Tech Inc.). In the measurement, hydrogen gas and oxygen gas were used as test gases, while argon and helium were used as the respective flow gases. The measurement was performed by the equal pressure method, and the measurement conditions were described below.

The gas was passed through the device for a certain period of time, during which the test gas concentration in the flow gas was measured by gas chromatography. Using the measured test gas concentration, the area and the thickness of the test membrane, and the gas flow time, a gas permeability coefficient [(cm$^3$(STP)·cm/cm$^2$·sec·cmHg)] was calculated.

In the examples herein, each gas permeability coefficient was converted to a value under standard conditions.
Test gas flow rate: 20 ml/min
Flow gas flow rate: 15 ml/min
Area of test membrane: 1.8 (cm$^2$)
Measurement temperature: 80° C.
Relative humidity: 0% RH to 95% RH

[Measurement of I-V Characteristic]

The I-V characteristic was measured under the following conditions.
Power generation cell: product of Electrochem, Inc., electrode area: 4.84 cm$^2$
Cell temperature: 80° C.
Fuel and air humidity: 40% RH to 100% RH
Anode gas: 84 ml/min hydrogen
Cathode gas: 400 ml/min synthetic air
Catalyst: TEC10E50E (TANAKA HOLDINGS Co., Ltd.)
Amount of platinum supported: 0.5 mg/cm$^2$
Ionomer: Nafion DE-521CS
Gas diffusion layer: SGL25BC Synthesis Example 1

A 100-mL recovery flask equipped with a reflux condenser and a Dean-Stark tube was charged with 4,4'-dichlorodiphenylsulfone (5.86 g), 4,4'-dihydroxydiphenylsulfone (4.64 g), potassium carbonate (3.33 g), DMAc (20 mL), and toluene (5 mL), and they were mixed in a nitrogen atmosphere and heated up to 180° C. The toluene was refluxed and the water thus generated was removed. Forty hours later, 1.0 g of 4,4'-dichlorodiphenylsulfone was further added, and six hours later the reaction mixture was cooled down to room temperature. The reaction mixture was then added to water and the solids thus precipitated were finely pulverized using a mixer, filtered, and then dried at 80° C. for 12 hours. The solids were then dissolved in dichloromethane and the solution was added to methanol. The solids thus precipitated were filtered, and then dried at 80° C. for 12 hours, thereby yielding a polymer (hereinafter, referred to as P1). With respect to the molecular weight of the resulting P1, Mn was 7400 and Mw/Mn was 2.52.

Synthesis Example 2

A 100-mL recovery flask equipped with a reflux condenser and a Dean-Stark tube was charged with 4,4'-dichlorodiphenylsulfone (6.31 g), 4,4'-dihydroxybenzophenone (4.28 g), potassium carbonate (3.59 g), DMAc (20 mL), and toluene (5 mL), and they were mixed in a nitrogen atmosphere and heated up to 180° C. The toluene was refluxed and the water thus generated was removed. Forty hours later, 1.0 g of 4,4'-dichlorodiphenylsulfone was further added, and six hours later the reaction mixture was cooled down to room temperature. The reaction mixture was then added to water and the solids thus precipitated were finely pulverized using a mixer, filtered, and then dried at 80° C. for 12 hours. The solids were then dissolved in dichloromethane and the solution was added to methanol. The solids thus precipitated were filtered, and then dried at 80° C. for 12 hours, thereby yielding a polymer (hereinafter, referred to as P2). With respect to the molecular weight of the resulting P2, Mn was 7600 and Mw/Mn was 2.62.

Synthesis Example 3

In a nitrogen atmosphere, 4,4'-dichlorobenzophenone (27 g) and 30% oleum (134 g) were mixed and the mixture was heated up to 130° C. under stirring. Twenty hours later, the reaction solution was cooled down to room temperature, and the reaction solution was then added to ice-cooled water. The resulting solution was neutralized with a NaOH aqueous solution and the white solids thus precipitated were collected by filtration. The residue was then dried at 100° C. under reduced pressure, thereby yielding a white solid (hereinafter, referred to as S1). Each benzene ring had one sulfonate group introduced thereinto.

Synthesis Example 4

In a nitrogen atmosphere, 4,4'-dichlorodiphenylsulfone (120 g) and 30% oleum (505 g) were mixed and the mixture was heated up to 120° C. under stirring. Four hours later, the reaction solution was cooled down to room temperature, and the reaction solution was then added to ice-cooled water. The resulting solution was neutralized with a NaOH aqueous solution and the white solids thus precipitated were collected by filtration. The residue was then dried at 100° C. under reduced pressure, thereby yielding a white solid (hereinafter, referred to as S2). Each benzene ring had one sulfonate group introduced thereinto.

Example 1

A 100-mL recovery flask equipped with a reflux condenser and a Dean-Stark tube was charged with P1 (1.0 g), S1 (1.5 g), DMSO (20 mL), and toluene (10 mL), and they were mixed in a nitrogen atmosphere and heated up to 180° C. The toluene was refluxed to remove the moisture in the flask. Toluene was then removed, and thereafter the contents were cooled down. Thereto were added 2,2'-bipyridine (1.5 g) and bis(1,5-cyclooctadiene)nickel (2.58 g) at 60° C., and they were stirred using a mechanical stirrer. Five minutes later, the reaction mixture was heated up to 80° C., and two hours later the reaction mixture was cooled down to room temperature. The reaction mixture was then diluted with DMSO (10 mL). The diluted mixture was added to 1 N aqueous hydrochloric acid and the solids thus precipitated were collected by filtration. The solids were dried under reduced pressure at 80° C. and finely pulverized. Then, the pulverized solids were put in 6 N aqueous hydrochloric acid, and stirred for six hours. The solids were filtered while being washed with water, and then dried under reduced pressure at 80° C., thereby providing a polymer electrolyte. As to the molecular weight, Mn was 62600 and Mw/Mn was 2.24.

The resulting polymer electrolyte (0.7 g) was dissolved in DMAc (20 mL), and the solution was applied by casting on a glass substrate, and vacuum-dried at 80° C. for 15 hours and then at 100° C. for 18 hours, thereby providing a self-supporting polymer electrolyte membrane (membrane thickness: 38 μm).

The polymer electrolyte membrane was immersed in 6 N aqueous hydrochloric acid for 12 hours, and then immersed in pure water twice each for one hour. Thereafter, the membrane was dried under reduced pressure at 100° C. The resulting membrane had an ion exchange capacity of 1.72 meq/g. The proton conductivity measured under low humidity conditions was $3.7 \times 10^{-3}$ S/cm.

Example 2

A 100-mL recovery flask equipped with a reflux condenser and a Dean-Stark tube was charged with P1 (1.0 g), S1 (1.5 g), DMSO (30 mL), and toluene (15 mL), and they were mixed in a nitrogen atmosphere and heated up to 180° C. The toluene was refluxed to remove the moisture in the flask. Toluene was then removed, and thereafter the contents were cooled down. Thereto were added 2,2'-bipyridine (1.5 g) and bis(1,5-cyclooctadiene)nickel (2.49 g) at 60° C., and they were stirred using a mechanical stirrer. Five minutes later, the reaction mixture was heated up to 80° C., and two hours later the reaction mixture was cooled down to room temperature. The reaction mixture was then diluted with DMSO (10 mL). The diluted mixture was added to 1 N aqueous hydrochloric acid, and the solids thus precipitated were collected by filtration. The solids were dried under reduced pressure at 80° C. and finely pulverized. Then, the pulverized solids were put in 6 N aqueous hydrochloric acid, and stirred for six hours. The solids were filtered while being washed with water, and then dried under reduced pressure at 80° C., thereby providing a polymer electrolyte. As to the molecular weight, Mn was 78500 and Mw/Mn was 2.09.

The resulting polymer electrolyte (0.7 g) was dissolved in DMAc (20 mL), and the solution was applied by casting on a glass substrate, and vacuum-dried at 80° C. for 15 hours and then at 100° C. for 18 hours, thereby providing a self-supporting polymer electrolyte membrane (membrane thickness: 24 μm).

The polymer electrolyte membrane was immersed in 6 N aqueous hydrochloric acid for 12 hours, and then immersed in pure water twice each for one hour. Thereafter, the membrane was dried under reduced pressure at 100° C. The resulting membrane had an ion exchange capacity of 2.10 meq/g. The proton conductivity measured under low humidity conditions was $8.6 \times 10^{-3}$ S/cm.

Example 3

A 100-mL recovery flask equipped with a reflux condenser and a Dean-Stark tube was charged with P1 (2.0 g), S1 (3.0 g), DMSO (60 mL), and toluene (30 mL), and they were mixed in a nitrogen atmosphere and heated up to 180° C. The toluene was refluxed to remove the moisture in the flask. Toluene was then removed, and thereafter the contents were cooled down. Thereto were added 2,2'-bipyridine (3.0 g) and bis(1,5-cyclooctadiene)nickel (5.0 g) at 70° C., and they were stirred using a mechanical stirrer. The reaction mixture was immediately heated up to 80° C., and three hours later the reaction mixture was cooled down to room temperature. The reaction mixture was then added to concentrated hydrochloric acid, and stirred for 30 minutes. Thereafter, much water was added to the mixture, and stirred for 30 minutes. The solids thus precipitated were collected by filtration. The solids were dried under reduced pressure at 100° C., thereby providing a polymer electrolyte. As to the molecular weight, Mn was 110000 and Mw/Mn was 1.97.

The resulting polymer electrolyte (0.7 g) was dissolved in DMSO (20 mL), and the solution was applied by casting on a glass substrate, and vacuum-dried at 80° C. for 15 hours and then at 100° C. for 18 hours, thereby providing a self-supporting polymer electrolyte membrane (membrane thickness: 20 μm).

The polymer electrolyte membrane was immersed in 6 N aqueous hydrochloric acid for 12 hours, and then immersed in pure water twice each for one hour. Thereafter, the membrane was dried under reduced pressure at 100° C. The resulting membrane had an ion exchange capacity of 1.97 meq/g. The proton conductivity measured under low humidity conditions was $6.8 \times 10^{-3}$ S/cm.

Example 4

A 100-mL recovery flask equipped with a reflux condenser and a Dean-Stark tube was charged with P2 (1.0 g), S1 (1.5 g), DMSO (30 mL), and toluene (15 mL), and they were mixed in a nitrogen atmosphere and heated up to 180° C. The toluene was refluxed to remove the moisture in the flask. Toluene was then removed, and thereafter the contents were cooled down. Thereto were added 2,2'-bipyridine (1.5 g) and bis(1,5-cyclooctadiene)nickel (2.43 g) at 60° C., and they were stirred using a mechanical stirrer. Five minutes later, the reaction mixture was heated up to 80° C., and two hours later the reaction mixture was cooled down to room temperature. The reaction mixture was then diluted with DMSO (10 mL). The diluted mixture was added to 1 N aqueous hydrochloric acid and the solids thus precipitated were collected by filtration. The solids were dried under reduced pressure at 80° C. and finely pulverized. Then, the pulverized solids were put in 6 N aqueous hydrochloric acid, and stirred for six hours. The solids were filtered while being washed with water, and then dried under reduced pressure at 80° C., thereby providing a polymer electrolyte. As to the molecular weight, Mn was 90500 and Mw/Mn was 2.05.

The resulting polymer electrolyte (0.7 g) was dissolved in DMAc (20 mL), and the solution was applied by casting on a glass substrate, and vacuum-dried at 80° C. for 15 hours and then at 100° C. for 18 hours, thereby providing a self-supporting polymer electrolyte membrane (membrane thickness: 44 μm).

The polymer electrolyte membrane was immersed in 6 N aqueous hydrochloric acid for 12 hours, and then immersed in pure water twice each for one hour. Thereafter, the membrane was dried under reduced pressure at 100° C. The resulting membrane had an ion exchange capacity of 2.28 meq/g. The proton conductivity measured under low humidity conditions was $1.1 \times 10^{-2}$ S/cm.

Figure 2:
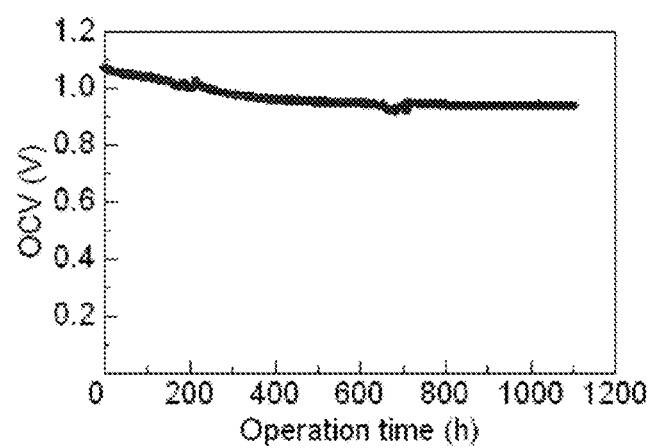
FIG. 2 shows the results of an OCV durability test on the membrane prepared in Example 4.

FIG. 2 shows the results of the OCV durability test. Even after a 1100-hour durability test, a rapid decrease in voltage due to membrane cracking was not observed and the membrane showed excellent durability.

Example 5

A 100-mL recovery flask equipped with a reflux condenser and a Dean-Stark tube was charged with P2 (2.0 g), S1 (3.0 g), DMSO (60 mL), and toluene (30 mL), and they were mixed in a nitrogen atmosphere and heated up to 180° C. The toluene was refluxed to remove the moisture in the flask. Toluene was then removed, and thereafter the contents were cooled down. Thereto were added 2,2'-bipyridine (3.0 g) and bis(1,5-cyclooctadiene)nickel (5.0 g) at 70° C., and they were stirred using a mechanical stirrer. The reaction mixture was immediately heated up to 80° C., and three hours later the reaction mixture was cooled down to room temperature. The reaction mixture was then added to concentrated hydrochloric acid, and stirred for 30 minutes. Thereafter, much water was added to the mixture, and stirred for 30 minutes. The solids thus precipitated were collected by filtration. The solids were dried under reduced pressure at 100° C., thereby providing a polymer electrolyte. As to the molecular weight, Mn was 68300 and Mw/Mn was 2.54.

The resulting polymer electrolyte (0.7 g) was dissolved in DMSO (20 mL), and the solution was applied by casting on a glass substrate, and vacuum-dried at 80° C. for 15 hours and then at 100° C. for 18 hours, thereby providing a self-supporting polymer electrolyte membrane (membrane thickness: 20 μm).

The polymer electrolyte membrane was immersed in 6 N aqueous hydrochloric acid for 12 hours, and then immersed in pure water twice each for one hour. Thereafter, the membrane was dried under reduced pressure at 100° C. The resulting membrane had an ion exchange capacity of 2.41 meq/g. The proton conductivity measured under low humidity conditions was $1.3 \times 10^{-2}$ S/cm.

Example 6

A 100-mL recovery flask equipped with a reflux condenser and a Dean-Stark tube was charged with P1 (2.0 g), S1 (1.5 g), S2 (1.5 g), DMSO (60 mL), and toluene (30 mL), and they were mixed in a nitrogen atmosphere and heated up to 180° C. The toluene was refluxed to remove the moisture in the flask. Toluene was then removed, and thereafter the contents were cooled down. Thereto were added 2,2'-bipyridine (3.0 g) and bis(1,5-cyclooctadiene)nickel (5.0 g) at 70° C., and they were stirred using a mechanical stirrer. The reaction mixture was immediately heated up to 80° C., and three hours later the reaction mixture was cooled down to room temperature. The reaction mixture was then added to concentrated hydrochloric acid, and stirred for 30 minutes. Thereafter, much water was added to the mixture, and stirred for 30 minutes. The solids thus precipitated were collected by filtration. The solids were dried under reduced pressure at 100° C., thereby providing a polymer electrolyte. As to the molecular weight, Mn was 62600 and Mw/Mn was 2.01.

The resulting polymer electrolyte (0.7 g) was dissolved in DMSO (20 mL), and the solution was applied by casting on a glass substrate, and vacuum-dried at 80° C. for 15 hours and then at 100° C. for 18 hours, thereby providing a self-supporting polymer electrolyte membrane (membrane thickness: 21 μm).

The polymer electrolyte membrane was immersed in 6 N aqueous hydrochloric acid for 12 hours, and then immersed in pure water twice each for one hour. Thereafter, the membrane was dried under reduced pressure at 100° C. The resulting membrane had an ion exchange capacity of 1.56 meq/g. The proton conductivity measured under low humidity conditions was $5.2\times10^{-2}$ S/cm.

Example 7

A 300-mL recovery flask equipped with a reflux condenser and a Dean-Stark tube was charged with P2 (4.0 g), S1 (6.0 g), 2,2'-bipyridine (6.0 g), DMSO (120 mL), and toluene (30 mL), and they were mixed in a nitrogen atmosphere and heated up to 170° C. The toluene was refluxed to remove the moisture in the flask. Toluene was then removed, and thereafter the contents were cooled down. Thereto was added bis(1,5-cyclooctadiene)nickel (10.0 g) at 70° C., and they were stirred for three hours using a mechanical stirrer. The reaction mixture was cooled down to room temperature, and then slowly added to 6 N aqueous hydrochloric acid. The solids thus precipitated were collected by filtration. The solids were filtered while being washed with water, and then dried under reduced pressure at 100° C., thereby providing a polymer electrolyte. As to the molecular weight, Mn was 53400 and Mw/Mn was 2.00.

The resulting polymer electrolyte (0.7 g) was dissolved in DMSO (20 mL), and the solution was applied by casting on a glass substrate, and dried under reduced pressure at 80° C. for 15 hours and then at 100° C. for 18 hours, thereby providing a self-supporting polymer electrolyte membrane (membrane thickness: 36 µm).

The polymer electrolyte membrane was immersed in 6 N aqueous hydrochloric acid for 12 hours, and then immersed in pure water twice each for one hour. Thereafter, the membrane was dried under reduced pressure at 100° C. The resulting membrane had an ion exchange capacity of 2.08 meq/g. The proton conductivity measured under low humidity conditions was $8.9\times10^{-3}$ S/cm.

Example 8

A 300-mL recovery flask equipped with a reflux condenser and a Dean-Stark tube was charged with P2 (4.0 g), S1 (6.0 g), 2,2'-bipyridine (6.0 g), DMSO (120 mL), and toluene (30 mL), and they were mixed in a nitrogen atmosphere and heated up to 170° C. The toluene was refluxed to remove the moisture in the flask. Toluene was then removed, and thereafter the contents were cooled down. Thereto was added bis(1,5-cyclooctadiene)nickel (10.0 g) at 70° C., and they were stirred for three hours using a mechanical stirrer. The reaction mixture was then cooled down to room temperature, and then slowly added to 6 N aqueous hydrochloric acid. The solids thus precipitated were collected by filtration. The solids were filtered while being washed with water, and then dried under reduced pressure at 100° C., thereby providing a polymer electrolyte. As to the molecular weight, Mn was 122800 and Mw/Mn was 2.30.

The resulting polymer electrolyte (0.7 g) was dissolved in DMSO (20 mL), and the solution was applied by casting on a glass substrate, and dried under reduced pressure at 80° C. for 15 hours and then at 100° C. for 18 hours, thereby providing a self-supporting polymer electrolyte membrane (membrane thickness: 47 µm).

The polymer electrolyte membrane was immersed in 6 N aqueous hydrochloric acid for 12 hours, and then immersed in pure water twice each for one hour. Thereafter, the membrane was dried under reduced pressure at 100° C. The resulting membrane had an ion exchange capacity of 2.57 meq/g. The proton conductivity measured under low humidity conditions was $1.6\times10^{-2}$ S/cm.

Figure 3:
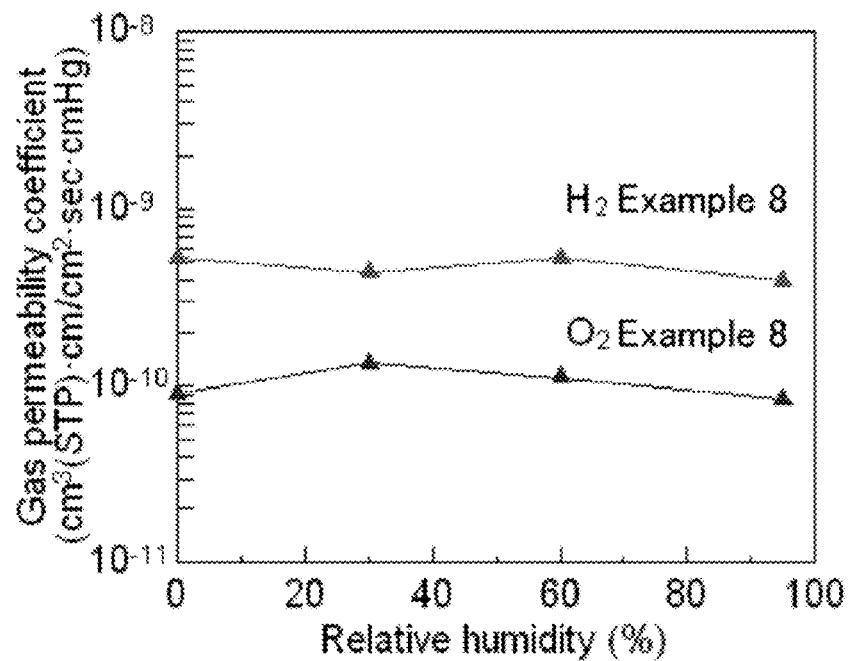
FIG. 3 shows the results of a gas permeability test on the membrane prepared in Example 8.

FIG. 3 shows the results of the measurement of the gas permeability coefficients for hydrogen and oxygen as a function of humidity. In both cases, the gas permeability coefficient was substantially the same regardless of humidity. There was thus no dependency on humidity.

Figure 4:
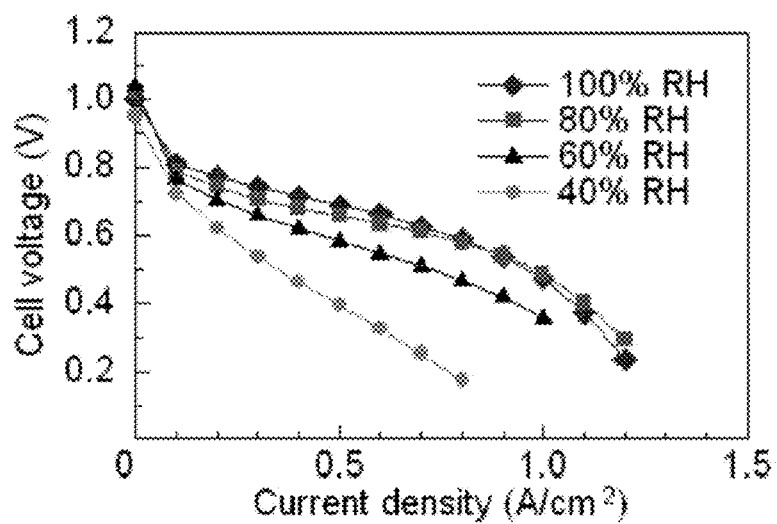
FIG. 4 shows the results of an I-V characteristic test on the membrane prepared in Example 8.

FIG. 4 shows the results of the I-V characteristic test. The membrane showed excellent performance although the voltage decreased with the decrease of humidity.

Comparative Example 1

The synthesis was performed in the same manner as in Example 1, except that S2 (1.5 g) was used instead of S1, and that P1 (1.5 g), DMSO (50 mL), toluene (16 mL), 2,2'-bipyridine (1.5 g), and bis(1,5-cyclooctadiene)nickel (2.4 g) were used. In the polymer washing step, however, the polymer dissolved during stirring in 6 N aqueous hydrochloric acid. The solution was neutralized with a NaOH aqueous solution and concentrated to collect the polymer, which was then dried under reduced pressure at 80° C., and the dried solids were washed with water, and dried under reduced pressure at 80° C. for three hours and then at 100° C. for 10 hours, thereby providing a polymer electrolyte. As to the molecular weight, Mn was 72700 and Mw/Mn was 1.67.

The resulting polymer electrolyte (0.7 g) was dissolved in DMAc (20 mL), and the solution was then applied by casting on a glass substrate, and vacuum-dried at 80° C. for 15 hours and then at 100° C. for 18 hours, thereby providing a polymer electrolyte membrane (membrane thickness: 30 µm).

The polymer electrolyte membrane was immersed in 6 N aqueous hydrochloric acid for 12 hours, during which the membrane dissolved.

Comparative Example 2

Pellets of polyphenylenesulfide (DIC-PPS LD10p11, DIC Corp.) were melt-extruded in a twin screw extruder including a twin screw mixing extruder equipped with a T-die at a screw temperature of 290° C. and a T-die temperature of 290° C. to obtain a polymer film. Then, 1-chlorobutane (634 g) and chlorosulfonic acid (15 g) were weighed into a glass container to prepare a solution of chlorosulfonic acid. The polymer film (1.5 g) was weighed and immersed in the solution of chlorosulfonic acid at 25° C. for 20 hours, thereby providing a polymer electrolyte membrane (the amount of chlorosulfonic acid added was 10 times as large as the weight of the polymer film). The polymer electrolyte membrane was then recovered, washed with ion exchange water until the membrane was neutral, and then vacuum-dried at 100° C. for 18 hours, thereby providing a self-supporting polymer electrolyte membrane (membrane thickness: 65 µm).

The resulting membrane had an ion exchange capacity of 2.20 meq/g. The proton conductivity measured under low humidity conditions was $7.5\times10^{-4}$ S/cm.

The comparison between Examples 1 to 8 and Comparative Examples 1 and 2 illustrates that the polymer electrolyte of the present invention is excellent in proton conductivity and has good water resistance.

INDUSTRIAL APPLICABILITY

The polymer electrolyte of the present invention is useful as a material for polymer electrolyte fuel cells. In particular, it is clearly useful for polymer electrolyte membranes.

REFERENCE SIGNS LIST

1: polymer electrolyte membrane
2: catalyst layer
3: diffusion layer
4: separator
5: channel
10: polymer electrolyte fuel cell

The invention claimed is:

1. A polymer electrolyte, containing, in its main chain, a repeating unit represented by the following formula (1) and at least one of the unit represented by the following formula (2) and the unit represented by the following formula (3):

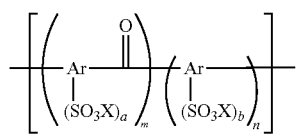
(1)

wherein Ar represents a benzene or naphthalene ring; X represents a proton or a cation; a and b are each an integer of 0 to 4, and the sum of a's and b's is 1 or greater; m is 1; and n is 1,

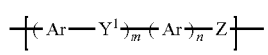
(2)

wherein Ar, m, and n are defined as in the formula (1); $Y^1$ is $SO_2$, $C(CH_3)_2$, or $C(CF_3)_2$; and Z represents a direct bond, oxygen, or sulfur,

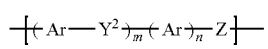
(3)

wherein Ar, m, and n are defined as in the formula (1); $Y^2$ is CO, $SO_2$, $C(CH_3)_2$, or $C(CF_3)_2$; and Z represents a direct bond, oxygen, or sulfur,
wherein the aromatic rings of formula (1) and at least one of formulas (2) and (3) are bonded by a C—C direct bond, and
$0 \leq B/(A+B) \leq 0.95$ wherein A is the number of moles of the unit represented by the formula (2) and B is the number of moles of the unit represented by the formula (3).

2. The polymer electrolyte according to claim 1,
wherein the repeating unit represented by the formula (1) is a unit represented by the following formula (4):

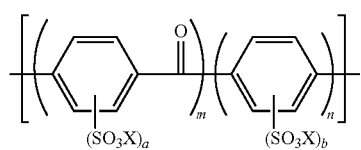
(4)

wherein X, a, b, m, and n are defined as in the formula (1).

3. The polymer electrolyte according to claim 1,
wherein the unit represented by the formula (2) is a unit represented by the following formula (5):

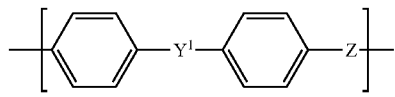
(5)

wherein $Y^1$ and Z are defined as in the formula (2), and
the unit represented by the formula (3) is a unit represented by the following formula (6):

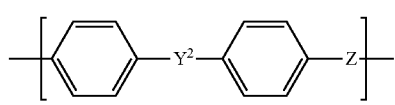
(6)

wherein $Y^2$ is defined as in the formula (3) and Z is defined as in the formula (2).

4. The polymer electrolyte according to claim 1, further containing, in its main chain, a unit represented by the following formula (7):

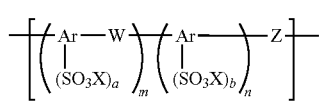
(7)

wherein Ar, X, a, b, m, and n are defined as in the formula (1); Z is defined as in the formula (2);
and W is a direct bond, CO, $SO_2$, $C(CH_3)_2$, or $C(CF_3)_2$.

5. The polymer electrolyte according to claim 1,
wherein the total content of the repeating unit represented by the formula (1) is 20% by weight or more of the whole.

6. The polymer electrolyte according to claim 1, which comprises a block copolymer containing a sulfonate-containing hydrophilic segment and a sulfonate-free hydrophobic segment,
the sulfonate-containing hydrophilic segment containing the repeating unit represented by the formula (1),
wherein the sulfonate-free hydrophobic segment contains the unit represented by the formula (2) and/or the unit represented by the formula (3).

7. The polymer electrolyte according to claim 6,
wherein the repeating unit represented by the formula (1) accounts for 20% by weight or more of the sulfonate-containing hydrophilic segment.

8. The polymer electrolyte according to claim 6,
wherein the sulfonate-containing hydrophilic segment contains, in its main chain, a repeating unit represented by the following formula (8):

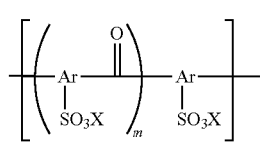
(8)

wherein Ar, X, and m are defined as in the formula (1).

9. The polymer electrolyte according to claim 1,
wherein the polymer electrolyte has an ion exchange capacity of 1.0 to 4.0 meq/g.

10. A polymer electrolyte membrane, comprising the polymer electrolyte according to claim 1.

11. A membrane electrode assembly, comprising the polymer electrolyte membrane according to claim 10.

12. A polymer electrolyte fuel cell, comprising the polymer electrolyte membrane according to claim 10.

13. A polymer electrolyte fuel cell, comprising the membrane electrode assembly according to claim 11.

14. The polymer electrolyte according to claim 6, wherein the sulfonate-containing hydrophilic segment further contains, in its main chain, a unit represented by the following formula (7):

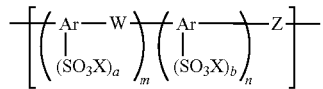
(7)

wherein Ar, X, a, b, m, and n are defined as in the formula (1); Z is defined as in the formula (2); and W is a direct bond, CO, $SO_2$, $C(CH_3)_2$, or $C(CF_3)_2$.

* * * * *